May 13, 1969　　　H. W. HUDSON　　　3,443,262
FLUSH VALVE TRIPPING DEVICE
Filed Nov. 30, 1967
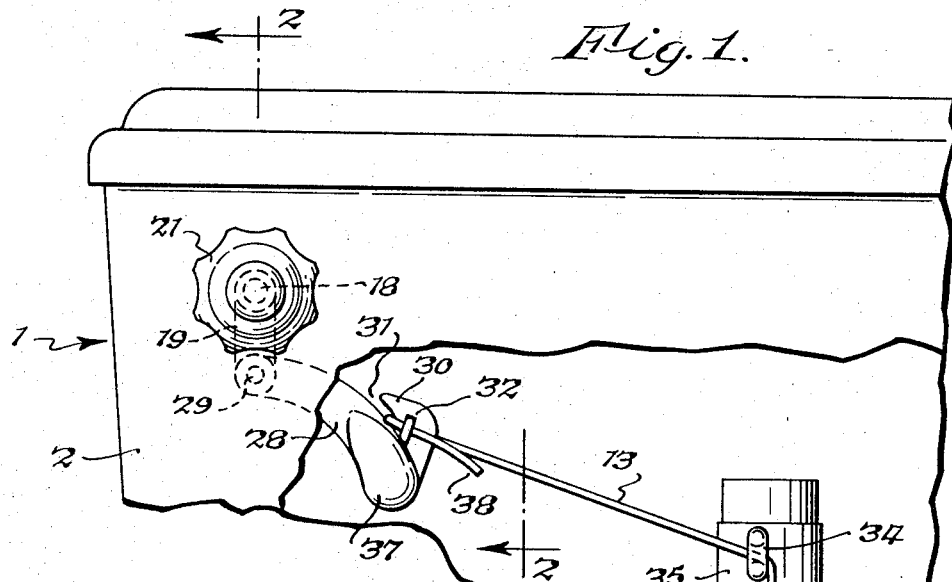
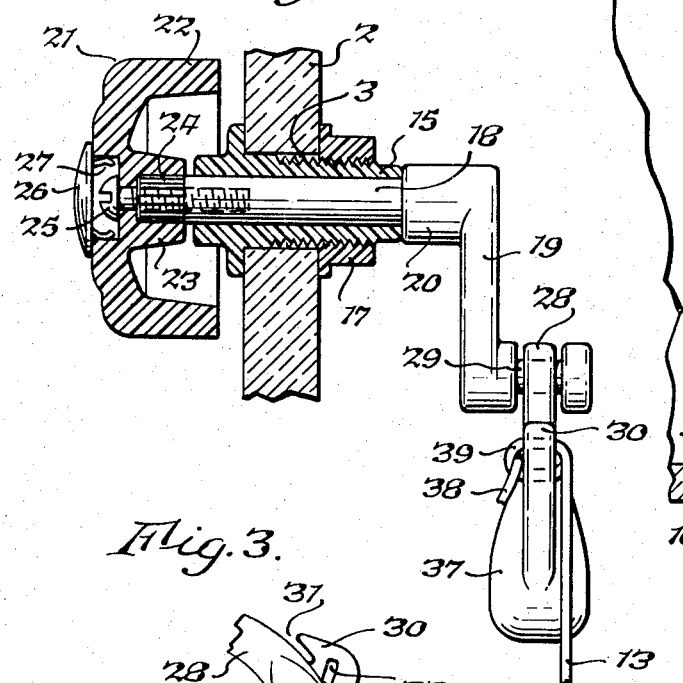
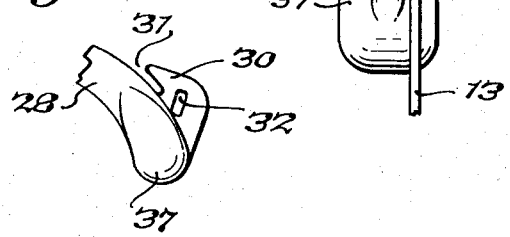
INVENTOR.
Harry W. Hudson
BY
Christel + Bean
ATTORNEYS.

United States Patent Office 3,443,262
Patented May 13, 1969

3,443,262
FLUSH VALVE TRIPPING DEVICE
Harry W. Hudson, Littleton, Colo., assignor to Twentieth Century Products Corporation, Englewood, Colo.
Continuation-in-part of application Ser. No. 556,602, June 10, 1966. This application Nov. 30, 1967, Ser. No. 686,964
Int. Cl. E03d 1/34, 5/02; F16h 21/44
U.S. Cl. 4—67                                                10 Claims

ABSTRACT OF THE DISCLOSURE

A crank is connected to one end of a stem and a handle connected to the other for rotating the stem within a bushing. A link is pivotally connected to the crank, and a flexible line is connected to the link and adapted for connection to a flush valve. The link is weighted adjacent the end to which the flexible line is connected. The flexible line is looped and the loop inserted through a slot in the link, with the adjacent end of the line passing through a second, open ended slot and through the loop, for being gripped thereby.

---

This application is a continuation-in-part of my pending application Ser. No. 556,602, filed June 10, 1966 and now Patent No. 3,406,408, dated Oct. 22, 1968 for Flush Valve Tripping Device.

Background of the invention

Flush valve tripping devices generally comprise an elongated, metallic lever arm fixed at one end to the stem of an actuating handle, and loosely connected at the opposite end to a metallic rod extending vertically from the valve. Such devices are operable in only one direction, which sometimes is annoying and inconvenient. Further, they tend to produce undesirable noise, and to corrode and break away after a period of use. Also, during initial installation thereof, it often is necessary to bend the various parts to obtain proper operation.

The use of plastics or other noncorrosive materials is highly desirable, and it also is desirable to provide a construction which can be freely rotated in either direction to open the valve. However, plastic materials tend to be rather light, and it can happen that the device will lock in a dead center position and hold the valve open. Another problem arises when free swinging parts are used, for rotation in either direction. When the valve initially opens, the water pressure holding it closed is abruptly relieved, permitting the free swinging part to swing and perhaps strike the wall of the tank.

Summary of the invention

Accordingly, it is an object of my invention to provide a flush valve tripping device having an actuating handle which can be turned in opposite directions to open the valve, and having an actuating linkage made of noncorrosive materials and so designed and arranged that it will not lock in a dead center position and will not strike the tank wall when pressure is relieved upon opening the valve.

Another object of my invention is to provide the foregoing in a device using a flexible cord to connect the actuating linkage to the valve, wherein means are provided facilitating the attachment of the cord to the linkage and also facilitating adjustment of tension in the cord.

The foregoing is accomplished in accordance with my invention by the provision of a weighted link interposed between a flexible cord attached to the flush valve and a crank mounted for rotation in either direction. The weighted link is designed and arranged so that gravitational force thereon will cause it to move out of a dead center position, and will restrain it against swinging into contact with the tank wall. Also, rather than having to thread the flexible cord through one or more apertures, a slot and loop arrangement is provided to facilitate attachment of the flexible cord to the linkage and adjustment of the tension on the cord.

Brief description of the drawing figures

FIG. 1 is a fragmentary view, partly in elevation and partly in section, showing a flush valve tripping device of my invention installed on a water closet, a portion of the front wall being broken away to show details.

FIG. 2 is a fragmentary sectional view thereof, on an enlarged scale, taken about on line 2—2 of FIG. 1; and FIG. 3 is a fragmentary detail view thereof.

Description of a preferred embodiment

Referring now in detail to the illustrative embodiment depicted in the accompanying drawing, there is shown a water closet generally designated 1 having a front wall 2 provided with an opening 3 therethrough adjacent an upper corner thereof. A flush or dump valve 4 is adapted to seat on a fitting 5 extending through the bottom wall 6 of closet 1 and thereby close an outlet conduit 7. Valve 4 can be of any desired type. Fitting 5 is locked in place by a nut 8, with a gasket 9 and a washer 10 being interposed between fitting 5 and nut 8 on opposite sides of the wall 6, in a manner well understood in the art. A pull rod 11 extends upwardly from valve 4, and has an eye 12 adapted to receive one end of a flexible cord or line 13 comprising part of the valve tripping device of this invention.

The valve tripping device includes a bushing 15 adapted to extend through opening 3 and having an annular flange bearing against the outer face of closet wall 2. A clamp nut 17 threaded on the inner end of bushing 15 abuts the inner face of wall 2, for clamping bushing 15 in place.

A stem 18 is journaled in bushing 15 for rotation about its lengthwise axis, and extends beyond bushing 15 at its opposite ends. A crank 19 has a hub 20 bonded or otherwise fixed on the inner end of stem 18, the hub 20 abutting the inner end of bushing 15 to preclude axial displacement of stem 18 outwardly of the bushing. Stem 18 and crank 19 can be a one-piece, unitary construction.

An actuating handle 21 having a fluted skirt 22 is formed with an internal hub 23 force fitted on the grooved outer end 24 of stem 18, for rotation therewith. Handle 21 is fastened to stem 18, as by a screw 25 extending through hub 23 and threading into the outer end of stem 18, the screw head being located within a recess in the outer face of the handle. A decorative cover plate 26 has a series of spring fingers 27 extending into the screw head receiving recess and frictionally gripping the wall thereof. The handle skirt 22 terminates short of the closet wall 2, and covers and conceals the external portions of stem 18 and bushing 15.

A link 28 is pivotally journaled at its inner end on the headed pin 29 of crank 19. Link 28 is provided adjacent its outer end with a hook formation 30 providing an elongated slot 31 opening generally toward the pivoted inner end of link 28.

A closed slot 32 is provided in link 28, in spaced relation to the slot 31, extending generally transversely thereof between slot 31 and the outer end of the link 28.

The flexible cord or line 13 is tied at its inner end to the eye 12, as shown at 33. At its opposite end, cord 13 is secured to link 28 in a manner to be described. Cord 13 passes through an eye 34 carried by a collar 35 mounted on overflow pipe 36, for guiding cord 13 relative to valve 4 and rod 11.

It will be appreciated that upon rotating handle 21 in either direction, crank arm 19 will swing the inner end of link 28 in an arc having crank 19 as its radius. The parts can be rotated a full 360°, through a position in which cord 13 and crank 19 are alined through the axis of stem 18, comprising in effect a dead center position.

It is a particular feature of my invention that the tripping device will not lock or hang-up in such dead center position, notwithstanding the relatively light weight of the plastic material preferably used in the manufacture thereof. This is because link 28 is weighted, adjacent its outer end, whereby the weight is given a significant moment arm relative to the pivot axis of pin 29. This can be accomplished in different ways, the illustrated embodiment showing link 28 as having a bulbous enlargement 37 adjacent its outer end. Link 28 is laterally enlarged on opposite sides of the link, and is arcuate whereby enlargement 28 is disposed below the point of attachment of cord 13 to the link.

The material comprising enlargement 37 adds significantly to the weight which link 28 would have if it were simply a flat member as shown adjacent its inner end. The added weight provided by such enlargement, being positioned a substantial distance from the pivot axis of pin 29, will cause link 28 to swing downwardly under the force of gravity, and will prevent the parts from hanging up in a dead center position when crank 19 is rotated clockwise as viewed in FIG. 1.

Another significant feature of this invention is that link 28 will not swing and strike the side wall of closet 1 when valve 4 is opened. When rotating handle 21 clockwise as viewed in FIG. 1, the rotating force is resisted by the water pressure on valve 4 and the various parts including cord 13 are placed under substantial tension. However, once valve 4 is opened, that pressure is abruptly relieved, freeing cord 13 and link 28 which latter tends to swing abruptly toward the tank side wall. However, the additional weight provided by enlargement 37 in spaced relation to the pivot axis of pin 29 causes link 28 to respond to gravitational force more rapidly than otherwise would be the case, as it moves through the vertical position precluding striking of the tank wall by the link 28.

Another feature of this invention resides in the provision made for attachment of cord 13 to link 28. It is not necessary to thread the end 38 of cord 13 through small apertures. Instead, cord 13 is simply looped as indicated at 39 in spaced relation to end 38, and loop 39 is inserted through slot 32 from one side of link 28 this being the right hand side as viewed in FIG. 2. End 38, however, is not pushed through slot 32, but instead is brought up around hook formation 30, through the open end slot 31 and through loop 39 on the opposite side of link 28. Pulling of the cord then tightens loop 39 against end 38, whereupon cord 13 is securely fastened to link 28.

In addition to the ease with which cord 13 can be attached to link 28, it is very simple to make any necessary adjustments in the tension of the cord. The person making the installation simply forms loop 39, passes it through the elongated slot 32, and then passes end 38 around slot 31 and through loop 39. Prior to tightening the loop against end 38, the person making the installation threads cord 13 through slots 31 and 32 in whichever direction is needed to provide the desired tension in the cord. Then, end 38 can be pulled while holding the cord on the opposite side of link 28, causing loop 39 to tighten against end 38. Alternately, end 38 can be held and the cord pulled on the opposite side of link 28.

The tension on cord 13 also can be adjusted at any time after installation. All that is required is to loosen loop 39 and end 38, pull cord 13 as needed to make the desired adjustment, and then tighten loop 39 on end 38.

All of the parts of the tripping device, with the exception of screw 25 and plate 26 preferably are of synthetic plastic materials, and except for handle 21 preferably are formed of a plastic which is substantially friction free and self lubricating, such as nylon or Teflon. The parts 25 and 26 are externally located, and therefore not subject to corrosion, nor do they contact any moving parts. Even these can be made of plastic, if desired, and handle 21 can be made of any suitably decorative plastic material. Cord 13 can be formed of plastic materials, or other material such as glass which avoids corrosion in the presence of atmosphere having a high moisture content.

Thus, it is seen that my invention fully accomplishes its intended objects. There is provided a valve tripping device which is relatively simple and inexpensive in construction, and which is durable and dependable in operation. The tripping device will not hang up in a dead center position, nor will it strike the tank wall as the valve is opened. The means for securing flexible line 13 to link 28 are both expeditious and effective.

What I claim is:

1. A flush valve tripping device adapted to trip a flush valve in a water closet comprising a bushing adapted for insertion through an opening in a wall of a water closet, a stem rotatable in said bushing, a crank connected to one end of said stem for rotation therewith, a handle connected to the opposite end of said stem for rotating the same, a link pivotally connected adjacent one end thereof to said crank and flexible means interconnecting said link adjacent the opposite end thereof and a flush valve said flexible means normally holding said link substantially in alignment therewith, said link including an increased weight portion adjacent said opposite end thereof, whereby said flexible connecting means frees said link for swinging movement about said pivotally connected end upon tripping of said flush valve.

2. A flush valve tripping device as set forth in claim 1, wherein said link is of one-piece construction laterally enlarged adjacent said opposite end thereof.

3. A flush valve tripping device as set forth in claim 1, wherein said bushing, said stem, said crank and said link are of plastic material.

4. A flush valve tripping device as set forth in claim 3, wherein said flexible means is a line of material resistant to corrosion in the presence of water.

5. A flush valve tripping device as set forth in claim 1, wherein said handle abuts one end of said bushing to prevent axial displacement of said stem in one direction, together with means carried by said stem abutting the opposite end of said bushing to prevent axial displacement of said stem in the opposite direction.

6. A flush valve tripping device as set forth in claim 5, wherein said last-named means comprise said crank.

7. A flush valve tripping device as set forth in claim 1, wherein said link is provided adjacent said opposite end thereof with a closed first slot and a second slot open at one end thereof, and wherein said flexible means comprises a flexible line having a looped portion spaced from one end thereof and inserted through said first slot from one side of said link, said one end of said line passing through said second slot from said one side of said link and through said looped portion of said line on the opposite side of said link.

8. A flush valve tripping device as set forth in claim 7, wherein said link is of one-piece construction having adjacent said opposite end thereof a hooklike formation opening generally toward said one end of said link to provide said second slot, said first slot extending traversely of said second slot in spaced relation thereto on the side thereof remote from said one end of said link.

9. A flush valve tripping device adapted to trip a flush valve in a water closet comprising a bushing adapted for insertion through an opening in a wall of a water closet, a stem rotatable in said bushing, a crank connected to one end of said stem for rotation therewith, a handle connected to the opposite end of said stem for rotating the same, a link pivotally connected adjacent one end thereof to said crank, and flexible means interconnecting said link adjacent the opposite end thereof and a flush valve, said link including an increased weight portion adjacent said opposite end thereof, wherein said link is provided adjacent said opposite end thereof with a closed first slot and a second slot open at one end thereof, and wherein said flexible means comprises a flexible line having a looped portion spaced from one end thereof and inserted through said first slot from one side of said link, said one end of said line passing through said second slot from said one side of said link and through said looped portion of said line on the opposite side of said link.

10. A flush valve tripping device as set forth in claim 9, wherein said link is of one-piece construction laterally enlarged adjacent said opposite end thereof and having adjacent said opposite end thereof a hooklike formation opening generally toward said one end of said link to provide said second slot, said first slot extending traversely of said second slot in spaced relation thereto on the side thereof remote from said one end of said link.

References Cited

UNITED STATES PATENTS

| | | | |
|---|---|---|---|
| 963,855 | 7/1910 | Blakemore | 4—67 |
| 1,667,990 | 5/1928 | Rogers | 4—67 |
| 2,304,512 | 12/1942 | Stanley | 4—67 |
| 2,482,970 | 9/1949 | Garratt | 4—67 |

FOREIGN PATENTS

| | | |
|---|---|---|
| 1,053,558 | 1/1967 | Great Britain. |

H. HAMPTON HUNTER, *Primary Examiner.*

U.S. Cl. X.R.

74—108